United States Patent
Trembley et al.

(10) Patent No.: US 6,490,883 B2
(45) Date of Patent: Dec. 10, 2002

(54) PROCESS AND APPARATUS FOR REMOVAL OF VOLATILE COMPOUNDS FROM PROCESS GASES

(75) Inventors: Jean-Philippe Trembley, Allentown, PA (US); John Louis Griffiths, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/879,016

(22) Filed: Jun. 12, 2001

(65) Prior Publication Data

US 2002/0000096 A1 Jan. 3, 2002

(30) Foreign Application Priority Data

Jun. 20, 2000 (GB) .............................. 0015123

(51) Int. Cl.[7] .................................. F25J 1/00
(52) U.S. Cl. .............................. 62/637; 62/642; 62/908
(58) Field of Search ........................... 62/85, 475, 637, 62/908, 642

(56) References Cited

U.S. PATENT DOCUMENTS

| | | | | |
|---|---|---|---|---|
| 1,717,540 A | * | 6/1929 | Aubert ........................ | 62/642 |
| 2,680,687 A | | 6/1954 | Lemonnier ..................... | 99/71 |
| 3,398,544 A | * | 8/1968 | Crownover .................... | 62/637 |
| 4,317,665 A | | 3/1982 | Prentice ....................... | 62/63 |
| 4,337,071 A | * | 6/1982 | Yang ........................... | 62/908 |
| 4,755,201 A | * | 7/1988 | Eschwey et al. ............... | 62/637 |
| 5,083,440 A | | 1/1992 | Karthaus et al. ............... | 62/282 |
| 5,182,926 A | | 2/1993 | Carns et al. ................... | 62/352 |
| 5,271,232 A | * | 12/1993 | Ogawa et al. ................. | 62/475 |
| 5,533,338 A | | 7/1996 | Lee et al. ..................... | 62/638 |
| 5,548,962 A | * | 8/1996 | Luger et al. .................. | 62/908 |
| 6,199,480 B1 | * | 9/2000 | Germain et al. ............... | 62/642 |

FOREIGN PATENT DOCUMENTS

| | | | | |
|---|---|---|---|---|
| GB | 1339700 | 12/1973 | ............. | A23F/1/08 |
| GB | 1480997 | 7/1977 | ............. | A23F/1/08 |

* cited by examiner

Primary Examiner—Ronald Capossela
(74) Attorney, Agent, or Firm—Robert J. Wolff (57) ABSTRACT

Volatile compounds ("VCs"), especially volatile organic compounds ("VOCs"), are cryogenically removed from a process gas stream ($p_W$) by cooling the gas stream in a condenser to condense the VC to form both liquid VC and VC ice and providing a treated process gas essentially freed of the VC but containing entrained VC ice particles, which are subsequently removed by passing the treated process gas through a filter downstream of the condenser to remove at least particles of a size greater than 50 μm. The condensation can be conducted in an indirect heat exchanger or by direct contact of the process gas with a liquid cryogen such as liquid nitrogen. It is preferred that the filter removes VC ice particles greater than 1 μm.

8 Claims, 7 Drawing Sheets

PROCESS AND APPARATUS FOR REMOVAL OF VOLATILE COMPOUNDS FROM PROCESS GASES

TECHNICAL FIELD OF THE INVENTION

The present invention relates to the cryogenic removal of volatile compounds ("VC"), especially volatile organic compounds ("VOCs"), from a process gas and has particular, but not exclusive, application to the removal of contaminants from a waste process gas stream to meet environmental requirements. It provides processes for removing volatile compounds and apparatus for use in those processes.

BACKGROUND OF THE INVENTION

Modern industrial processes often produce a gaseous waste stream containing one or more volatile contaminants such as, for example vaporized reactant, product or solvent. Environmental legislation limits the extent to which these contaminants can be released into the atmosphere and several technologies exist to remove them from waste streams. However, with new maximum concentrations being set by environmental bodies as well as more pressure on enforcement, existing technologies often cannot clean waste steams to the desired level in a cost-effective manner.

Process gas streams are cleaned of contaminant(s) chemically by, for example, burning or reaction with another chemical added to, or present in, the process stream, or physically by, for example, condensation. Cryogenic condensation is particularly suitable for removal of a volatile compound, especially a VOC because it permits of the recovery and re-use of the compound. In cryogenic condensation, the process gas stream is cooled to temperatures at which the VC condenses out to form a liquid phase of high VC concentration and a gaseous phase of low VC concentration. The amount of VC left in the gas stream is dependant upon several factors, especially temperature, pressure, process stream composition, and the identity of the VC. In order to meet the relevant legislation, the outlet temperature may have to be well below that required to condense the VC in order to ensure that the remaining VC content of the waste gas is reduced to the required level. With the tightening of legislation, it is probable that, in many cryogenic condensation processes, the outlet temperature will have to be decreased from those currently used. For example; to meet an emission requirement of 20 mg/m$^3$ to recover methyl chloride ($CH_3Cl$; freezing point $-97.6°$ C.; boiling point $-23.7°$ C.) an outlet temperature of $-150°$ C. is required and for methylene chloride ($CH_2Cl_2$; freezing point $-97°$ C.; boiling point $+40.1°$ C.) an outlet temperature of $-120°$ C. is required.

Further, it may be necessary for a cryogenic condensation process to deal with process gas streams having small differences in composition and from which a VC is substantially entirely removed at a common temperature but for which streams there are significant differences in the extent of VC removal at higher temperatures.

The requirement for colder temperatures often causes the VC to freeze forming so-called "VC ice". Normally shell-and-tube heat exchangers are used to remove a VC by indirect condensation with liquid nitrogen, or another cryogen, passing on the tube side (inside) of the exchanger, and the VC condensing on the shell side. When freezing takes place, VC ice builds up on the surface of the exchanger tubes, which over time reduces the effectiveness of the exchanger. The normal solution to the problem of VC ice build-up is to have two heat exchangers so that, when one heat exchanger requires regeneration, the process stream can be diverted to the other heat exchanger. Regeneration is by warming to melt the VC ice for removal as a liquid. This 'freeze-thaw' type of system is also required when moisture (water vapour) or other compound with a relatively high freeze point is present within the process stream. However, the capital and operating costs are relatively high because of the duplication of equipment and there is a problem of VC ice entrainment as discussed below.

The problem of freezing also can be mitigated by the use of two or more condenser units arranged in series with decreasing operating temperatures. In particular, a first condenser can be provided to pre-cool the waste stream to, for example, $+1°$ C., to remove the majority of water before it freezes, and the resultant gaseous stream further cooled in a second condenser with the outlet temperature set to remove the VC. An alternative arrangement is shown in U.S. Pat. No. 5,083,440 where an intermediate heat transfer fluid cooled by the cryogen is used to maintain the process stream temperature above the VC freeze point. U.S. Pat. No. 5,533,338 describes a special cryogenic heat exchanger that utilises a cold, re-circulating, vaporized nitrogen fluid as the refrigeration medium inside the condenser tubes permitting, by careful control of the fluids circulation rate and temperature, the effect of freezing to be minimized.

When cryogenic condensation is used to remove contaminants from a process stream and especially when it is required to cool a solvent to well below its dew-point, fogging can occur within the process stream. When the rate of cooling of a gas exceeds the rate of mass transfer, the bulk of the gas quickly cools to below the dew point of the condensable vapour forming droplets which condense in the process stream without making any contact with a cold surface of the condenser. This fogging can be minimized by using a successive series of cooling stages with increasing temperature control across each step or by using a de-mister to capture the droplets within the condenser, thereby preventing droplets being than entrained in the process gas stream.

When operating at very low temperatures, small particles of VC ice often are entrained in the cleaned process gas exiting a cryogenic condenser, thereby increasing the retained VC content above the design level of the condenser. As VC ice builds up on exchanger tubes, the outer layer of the ice is like a fine powder and is easily picked up and entrained by the process gas stream passing over it. If the process gas velocity is high, some VC ice can become entrained in the gas stream, especially if the residence time in the exchanger is too short. Further, the strength of adhesion of VC ice to the exchanger tube can be low if, for example, the rate of ice formation is so rapid that, as the ice forms on a cold surface, contraction takes place and the bond that causes the ice to stick to the surface is broken.

Systems installed to prevent the entrainment of VC ice in the cleaned process stream typically have been liquid separation devices such as wire mesh de-misters and/or liquid separators. Although these systems work well for removal of liquid droplets, they are ineffective with fine (less than 100 μm) particles and cause pressure drop problems in the system due to VC ice blockage. Further, de-misters are installed in the end of the condensers, after the tube bundle, and cannot be easily kept cold or defrosted.

It has long been well known to produce coffee aroma frost by use of a cryogenic condenser to condense volatiles from an aroma-bearing gas produced during coffee processing (see, e. g. U.S. Pat. No. 2,680,687 published Jun. 8, 1954). The gas typically is mainly carbon dioxide (up to 90 wt % or more) together with water vapour and the aromatic constituents responsible for the aroma.

GB-A-1,339,700 (published Dec. 5, 1973) disclosed the use of a scraped-wall condenser in which aroma frost is continuously or periodically scrapped from a cryogenically cooled condenser wall on which it builds-up.

GB-A-1,480,997 (published Jul. 27, 1977) disclosed using a filter element to accumulate sublimated aroma frost particles entrained in the gaseous phase remaining after condensation. The resultant layer of aroma frost particles built-up on the filter element is stated to minimize passage of uncondensed aromatics directly to the atmosphere as well as minimising the loss of frost particles. The element can be located internally or externally of the condenser and can be freed of frost by shaking or vibrating the filter.

U.S. Pat. No. 5,182,926 (published Sep. 16, 1991) discloses directly contacting coffee or other sublimated aroma-bearing gas with liquid nitrogen to form a suspension of aroma frost particles in gaseous nitrogen. The suspension is passed through a tubular porous filter to collect the sublimated aroma frost particles, which are dislodged from the filter by periodically back pulsing the filter.

It also is known from, for example, U.S. Pat. No. 4,317,665 (published Mar. 2, 1982) to separate water ice from recycle air leaving a cryogenic food freezer by passage of the air through a bag filter which is periodically pulsed to dislodge ice collected on the bag.

The object of the present invention is to improve the efficacy with which cryogenic condensation can be used to remove VC contaminants from process gas streams. In particular, in a first embodiment of the present invention, the object is to reduce the VC content of the treated stream remaining after liquid condensation of the VC content thereof with accompanying VC ice formation. It is an object of a second embodiment of the invention to reduce the VC content of the treated stream remaining after condensation of the VC content in a vortex of liquid cryogen, e.g. liquid nitrogen.

SUMMARY OF THE INVENTION

It has been found that the primary object of the invention can be achieved in a relatively simple and cost effective manner by provision downstream of the condenser of a filter to remove at least particles of a size of greater than about 50 $\mu$m entrained in the treated waste stream.

According to an embodiment of one aspect, the present invention provides a cryogenic process for the removal of a volatile compound ("VC") from a process gas stream comprising cooling the gas stream in a condenser to condense the VC to form both liquid VC and VC ice and provide a treated process gas which is essentially freed of the VC but contains entrained VC ice particles. The improvement consists of passing said treated process gas through a filter downstream of the condenser to remove at least said entrained VC ice particles which are of a size greater than about 50 $\mu$m.

According to another embodiment of this aspect, the present invention provides a cryogenic process for the removal of VC from a process gas stream comprising cooling the gas stream within a condenser to condense the VC to form VC ice and provide a treated process gas which is essentially freed of the VC but contains entrained VC ice particles. The improvement consists of cooling the gas stream in a vortex of liquid cryogen and passing the treated process gas through a filter downstream of the condenser to remove at least said entrained VC ice particles which are of a size greater than 50 $\mu$m.

The present invention also provides an apparatus for the cryogenic removal of a volatile compound ("VC") from a process gas stream by a process of the first aspect, said apparatus comprising:

a condenser for cooling the gas stream to form both liquid VC and VC ice and providing a treated process gas which is essentially freed of the VC but contains entrained VC ice particles;

means for removing said liquid VC from the condenser;

means for removing sa id VC ice from the condenser;

means for removing said treated process gas from the condenser; and filter means downstream of the condenser to remove at least said entrained VC ice particles which are of a size greater than about 50 $\mu$m from the treated process gas stream.

According to another embodiment of this aspect, the present invention provides an apparatus for the cryogenic removal of a volatile compound ("VC") from a process gas stream by a process of the first aspect, said apparatus comprising:

a condenser for cooling the gas stream in a vortex of liquid cryogen to form VC ice and providing a treated process gas which is essentially freed of the VC but contains entrained VC ice particles;

means for providing a vortex of liquid cryogen within the condenser; and filter means downstream of the condenser to remove at least said entrained VC ice particles which are of a size greater than 50 $\mu$m from the treated process gas stream.

DETAILED DESCRIPTION OF THE INVENTION

As mentioned previously, the invention has particular application to the removal of VC contaminants from a waste gas stream prior to discharge of the waste gas to the environment. However, it also is applicable to the removal of VC contaminants from a product gas steam or from a process gas stream for recycle to the relevant process. For example, the invention can be can be used to treat process vent streams of pharmaceutical, speciality chemicals and other batch chemical manufacturing processes or a physical process such as heating a product to drive off a solvent used in its manufacture.

The VCs removable by the process of the present invention can be any contaminant, which can be separated as a liquid phase from a process gas stream by cooling the stream and usually will have a vapour pressure of at least about 0.01 kPa at 20° C. The invention has particular application to organic contaminants (i.e. VOCs) having said a vapour pressure. Examples of VOCs which can be removed by the process of the present invention include alcohols such as, for example, methanol, ethanol, 1-propanol and 1-butanol; aldehydes and ketones such as, for example, acetone and methylethylketone; acids and esters such as, for example, acetic acid and ethyl acetate; hydrocarbons such as, for example, toluene, cyclohexane and methylcyclohexane; and halogenated hydrocarbons such as, for example, trichloroethylene ("Trike"), dichloromethane and methyl chloride.

The VC condensation can be conducted by indirect contact with a cryogen or by directly spraying liquid cryogen, especially liquid nitrogen, into the stream. The rate of condensation and size of VC ice particle formed will depend upon the temperature gradient during condensation. Generally, the steeper the temperature gradient, the quicker the condensation will be performed and the smaller will be the average size of VC ice particles formed. The condensation is conducted to condense the VC as both liquid and ice. Usually, the majority, and often substantially all, of the VC will be condensed as liquid; the ice being inevitably formed in the colder areas of the condenser such as on cooled condenser surfaces or at the distal end of the condenser when that end is maintained at a temperature low enough to freeze out any VC not already removed by liquid condensation.

By using a separate VC ice filter downstream of the condenser, the correct filtration area required for the particular application can be installed without the size constraints attendant on locating the filter in the condenser. In particular, the filtration area can be selected having regard to the required clean system pressure drop and the maximum allowed pressure drop when the system is in operation. Another advantage of the separate filter is that it facilitates cooling, temperature control and cleaning of the filter elements. Cooling can be achieved by the process gas flowing through the filter and/or by the use of direct or indirect cooling with a liquid cryogen. However, the condenser and filter can be provided as an integrated unit in which a cryogen and the gas stream to be treated are separately introduced into a housing in which the filter is mounted.

The filter can be fabricated as, for example, a cylindrical element of woven mesh material suspended from a tube plate enclosed in a housing but it is preferred that the filter is formed of porous ceramic or metal, especially sintered porous metal or ceramic. Suitable filters are available from Pall Europe Ltd under the Trade Marks Pall PSS (sintered metal alloy powder filters), Rigimesh (sintered woven wire alloy mesh filters) and Vitropore (silicon carbide filters) and from USF Schumacher UK under the Trade Mark Dia-Schumalith (membrane-faced silicon carbide filters). The filter retains particles of at least about 50 $\mu$m diameter, preferable of at least about 25 $\mu$m diameter, more preferably of at least about 10 $\mu$m diameter, especially of at least about 1 $\mu$m diameter, and more especially of at least about 0.3 $\mu$m diameter.

The process gas from the condenser passes through the filter but VC ice entrained therein is retained and collected on the upstream surface of the filter. As filtration continues, a layer of VC ice of increasing thickness builds-ups on the filter and is periodically dislodged therefrom. The periodicity with which the layer is dislodged can be determined by, for example, a pre-set pressure drop or cycle time. The filter can be cleaned of VC ice by shaking or vibration, especially by pulsing the filter in known manner. Conveniently, the layer is dislodged by passing a reverse flow of gas through the filter, thereby displacing the collected VC ice and allowing it to fall under gravity to the bottom of the filter housing for separate recovery and removal.

In embodiments of the present invention in which the condenser and the filter are provided as an integrated unit, the design of the filter housing is preferably such that it encourages the gas stream to form a vortex (or cyclone). For example, the housing may be in the form of a tapered cylinder. The effect of the vortex is such that a portion of the VC ice (generally the larger particles) is removed before the ice reaches the filter thereby removing as much of the VC ice without the need for the gas to pass through the filter, thereby reducing the amount of back pulsing required to clean the filter.

The vortex may be generated in two ways. First, the gas stream inlet of the VC condenser/filter unit may introduce the gas at an angle to the radius of the tapered cylinder of the unit thereby forcing the gas to travel around the curved walls of the unit. In such an arrangement, the gas stream inlet can be said to be orientated off-centre from the circumference of the unit. Secondly, the liquid cryogen (e.g. liquid nitrogen) spray(s) may be arranged in such a manner that they point in the same direction as the circulation caused by the off-centre orientation of the gas stream inlet. This arrangement of the liquid cryogen sprays enhances the effect of the vortex.

A further advantage of the vortex is that the time the gas stream is within the unit housing is extended. This extension of time not only ensures that substantially all of the VC is frozen but also allows each VC ice crystal to grow to a larger size, ensuring the filter pore size required is larger.

The design of the nozzle for the gas stream inlet is important as a poor or incorrect design of the nozzle can lead to the formation of VC ice within the nozzle. A build up of VC ice within the nozzle will eventually lead to the blocking of the inlet. In order to prevent blockage in this way, a vacuum insulated nozzle may be used having a low loss end.

The inventors have discovered that back pulse performance of the present invention is surprisingly and unexpectedly good. A low level of adhesion of VC snow crystals to the surface of the filter is observed. Without wishing to be bound by any particular theory, it is believed that low adhesion to the filter occurs because, when VC snow builds up of the surface of the filter, it tends to adhere to itself rather than the filter.

This preference for self-adherence means that the VC snow is easier to shift from the filter resulting in completely clean filters after a back pulse. This only occurs, however, if the process is operated significantly below (e.g. about −5 to about −15° C.) the freezing temperature of the VC. Operating closer to the freeze point of the VC, ice (rather than crystalline snow) tends to form and block the filter very quickly. This ice will not be removed so easily with back pulsing. For operations that contain moisture (water vapour) or high freeze point solvents then operating temperatures below about −40° C. are required in order to see this benefit. It is advantageous to pre-cool the filter element and filter housing under an inert nitrogen gas atmosphere before the introduction of the process gas stream containing the solvent to be recovered.

Figure 1:
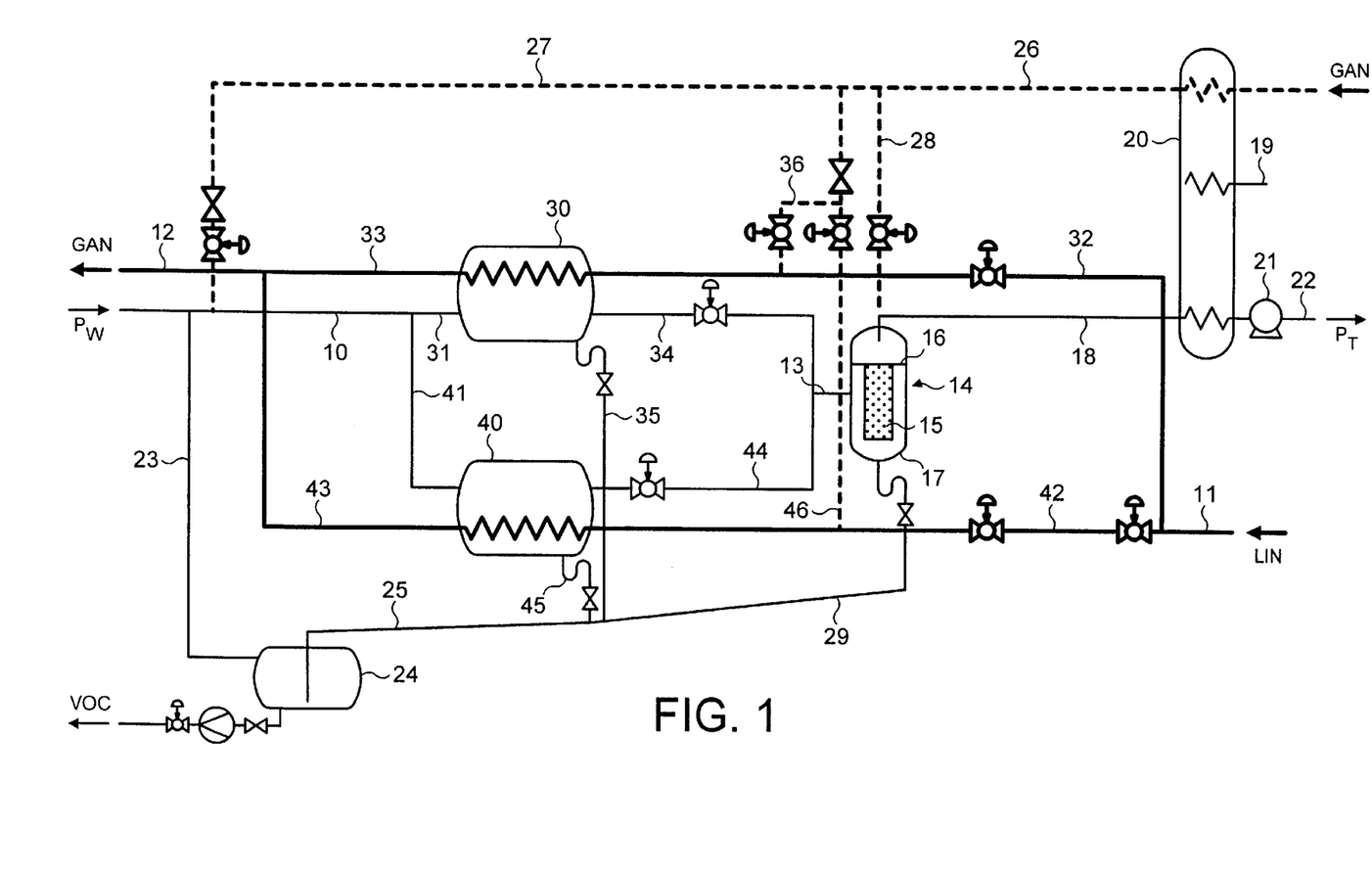
FIG. 1 is a schematic representation of apparatus for removing a VOC from a waste process gas stream in accordance with a presently preferred embodiment.

Referring to FIG. 1, process stream components are shown in medium weight lines, heat exchange fluid components are shown in heavy weight lines, and regeneration components are shown in dotted lines.

A waste process gas $P_W$ is supplied via an inlet conduit 10 and one of conduit branches 31 and 41 to the shell section of one of a pair of shell-and-tube condensers 30 and 40 respectively arranged in parallel in known manner so that only one is performing condensation duty whilst the other is on stand-by or being regenerated (see below). Cooling duty for the on-line condenser is provided by liquid nitrogen LIN provided to the tube section of the condenser via a LIN inlet conduit 11 and a respective conduit branch 32 or 42 and is vaporized in said section. The resultant gaseous nitrogen GAN is removed from the on-line condenser via a respective conduit branch 33 or 43 and a common outlet conduit 12.

Treated gas from the on-line condenser is passed via a respective conduit branch 34 or 44 and a common conduit 13 to a filter 14 consisting of a right circular cylinder 15 of woven sintered stainless steel wire mesh (Rigimesh™) or sintered porous metal (PSS™) suspended from a tube plate 16 mounted within a housing 17. Particles of a size larger than the mesh or pore openings entrained in the treated process gas issuing from conduit 13 are retained on the outer surface of the filter cylinder 15 as the gas passes through the openings. The filtered gas exits the filter via a conduit 18 and is warmed against a process stream 19 in a heat exchanger 20 to recover refrigeration before passage through a pump 21 to an exhaust conduit 22 for venting to atmosphere as exhaust gas $P_T$.

The waste gas $P_W$ contains one or more VOCs as contaminant(s). If a part of the contaminant content is present as liquid droplets, these are separated and fed via conduit 23 to a VOC condensate storage tank 24. The remaining VOC content is removed by condensation in the on-line condenser 30 or 40. Substantially all of the remaining VOC content is condensed as liquid and fed via a respective conduit branch 35 or 45 and a common conduit 25 to the storage tank 24. However, small amounts of the VOC will freeze to form VOC ice, which will build up on the outer surfaces of the condenser tube section. Some fine VOC ice particles will be entrained in the treated gas leaving the condenser but will be retained by the filter cylinder 15.

Ice built up within the on-line condenser 30 or 40 and the filter 14 requires removal from time to time. In the case of the condenser, the removal is conducted in known manner by taking the condenser off line and replacing the liquid nitrogen supply with gaseous nitrogen GAN warmed against the process stream 19 in the heat exchanger 20 and supplied via a GAN inlet conduit 26 and a respective conduit branch 36 or 46. The warmed gaseous nitrogen causes the ice on the condenser tube section to melt for removal to the storage tank 24 in the manner of the liquid condensate.

Provision also is made for the supply of warmed gaseous nitrogen via a conduit 27 to replace the process gas $p_W$ in conduit 10 to purge the process gas components of process gas or to remove any blockage.

The filter 14 is periodically cleaned by pulsed reverse flow of warm gaseous nitrogen supplied via a conduit 28 to dislodge and melt the ice retained by the filter cylinder 15. The resultant liquid VOC is fed to the storage tank via a conduit 29 connected to conduit 25.

The storage tank 24 is emptied as and when required to discharge the liquid condensate VOC for disposal, destruction or reuse as appropriate.

Figure 2:
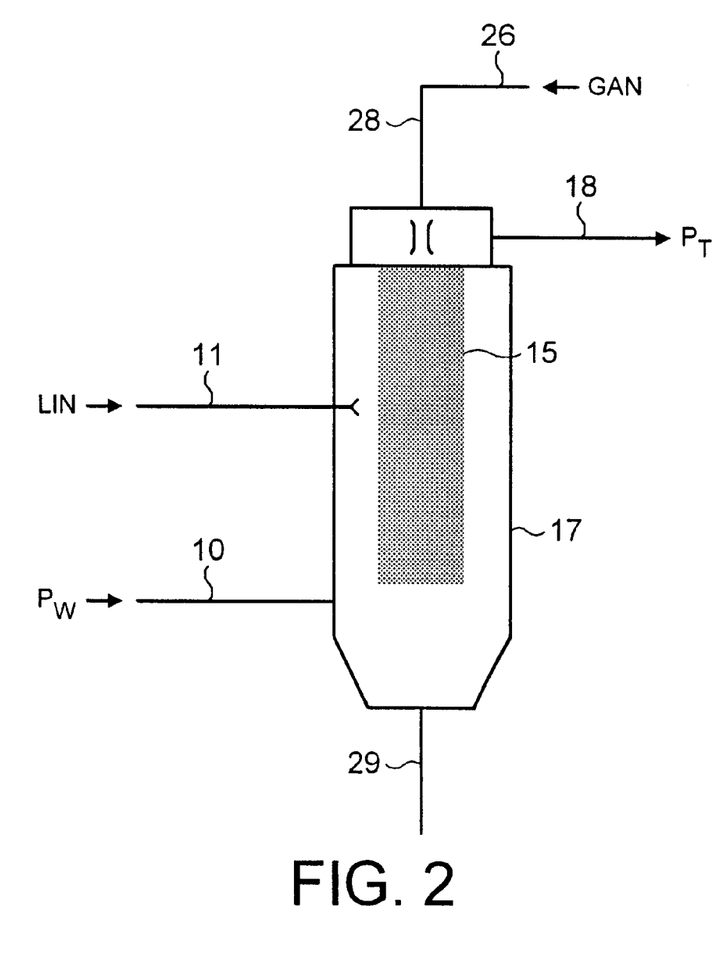
FIG. 2 a schematic representation of apparatus for removing a VOC from a waste process gas stream in accordance with another embodiment.

The same reference numerals as used in FIG. 1 are used in FIG. 2 to indicate corresponding components. The embodiment of FIG. 2 differs from that of FIG. 1 in that condensation is conducted in the filter housing 17. Liquid nitrogen LIN is fed via conduit 11 into the housing 17 to condense waste gas $p_W$ supplied at ambient temperature via conduit 10. The cryogenically cooled gas passes through a right circular cylinder 15 of woven sintered stainless steel wire mesh (Rigimesh™) or sintered porous metal (PSS™) mounted within the housing 17 so that VOC ice and other entrained particles of a size smaller than the mesh or pore openings are retained and the filtered gas exits via conduit 18. The filter element 15 is periodically cleaned by pulsed reverse flow of warm gaseous nitrogen GAN supplied via conduit 28 to dislodge and melt the ice retained by the filter cylinder 15. The resultant liquid VOC is removed via conduit 29.

Using the apparatus of FIG. 2, experiments were conducted to assess the relative effectiveness of filters having pore sizes of 1 $\mu$m and 20 $\mu$m in the cryogenic removal first of water ice from a stream of nitrogen saturated with water at ambient temperature and secondly of trichloroethylene ("Trike") from nitrogen saturated with Trike at ambient temperature. The filter was periodically cleaned using a back pulse of high pressure gas allowing 24-hour continuous operation without the need for regeneration.

The efficacy of the apparatus was first demonstrated using water vapour. Water vapour was introduced to the ice filter and frozen to water ice by direct heat exchange using liquid nitrogen. The water ice was then filtered and removed by back pulsing the filter.

The experiment varied the operating temperature (from −30° C. to −120° C.) of the ice filter and also the filter pore size and type. By changing the temperature inside the filter housing, it was possible to control the amount of water that remains in vapour form (vapour pressure or dew point). If the filter is 100% efficient all the solid water ice will be removed and the dew point (or vapour pressure) of the exhaust theoretically reflects the temperature inside the filter housing. If the filter is not 100% efficient, solid ice will pass through the filter and raise the dew point (or vapour pressure) in the exhaust. Using this principal, the filters can be tested by operating the ice filter over a range of temperature and measuring the dew point of the exhaust. A filter with 100% efficiency will have a dew point in the exhaust equal to the filter housing temperature. If the dew point is above that temperature solid ice must be passing through the filter, i.e. the size of some of the water ice crystals must be less than the filter pore size.

Figure 3:
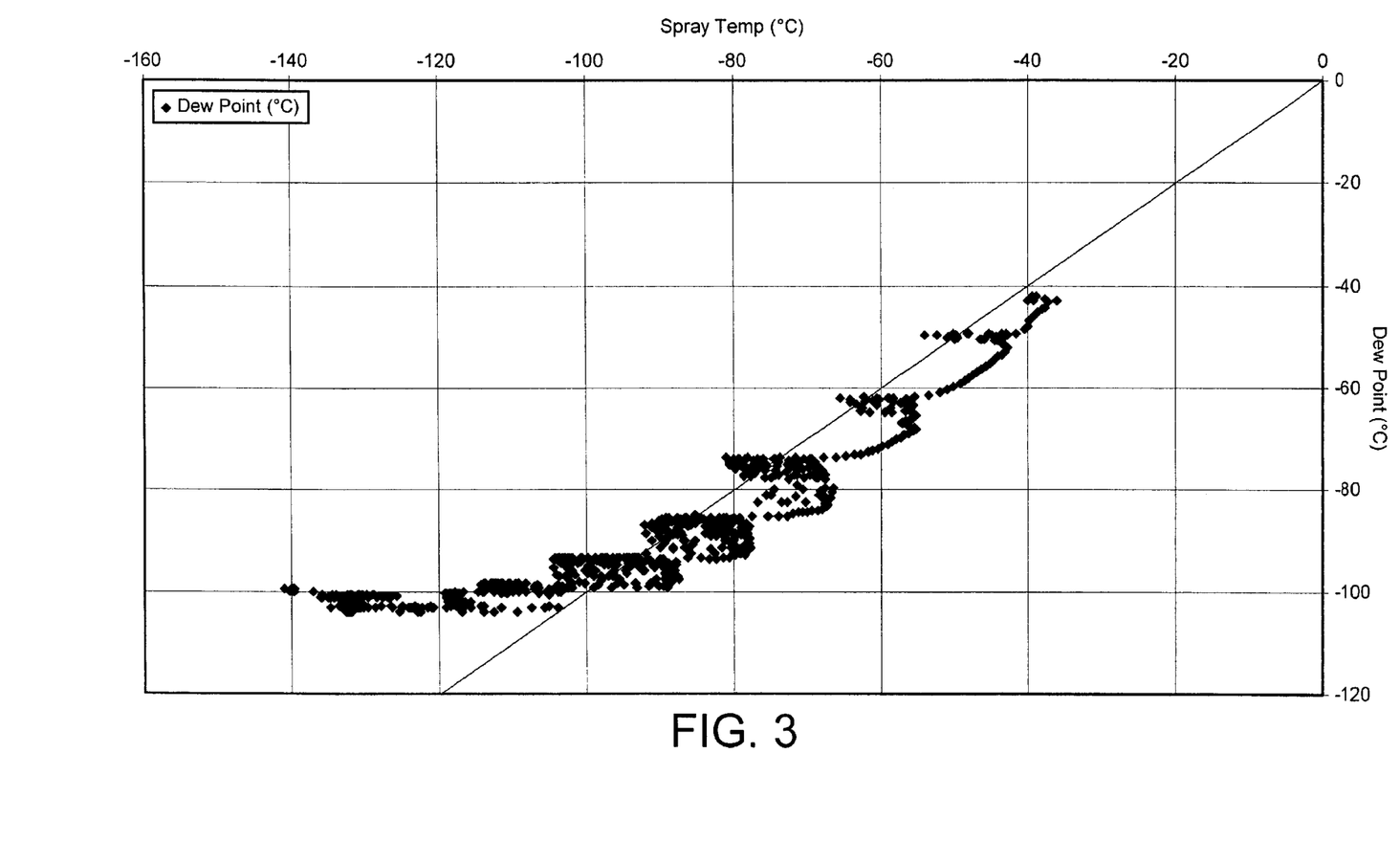
FIG. 3 is a graphical representation of the results of an experiment to remove water ice from a stream of nitrogen using apparatus of the present invention comprising a 20 $\mu$m filter and depicts how the dew point of the exhaust stream varies with temperature from –30° C. to –120° C.
Figure 4:
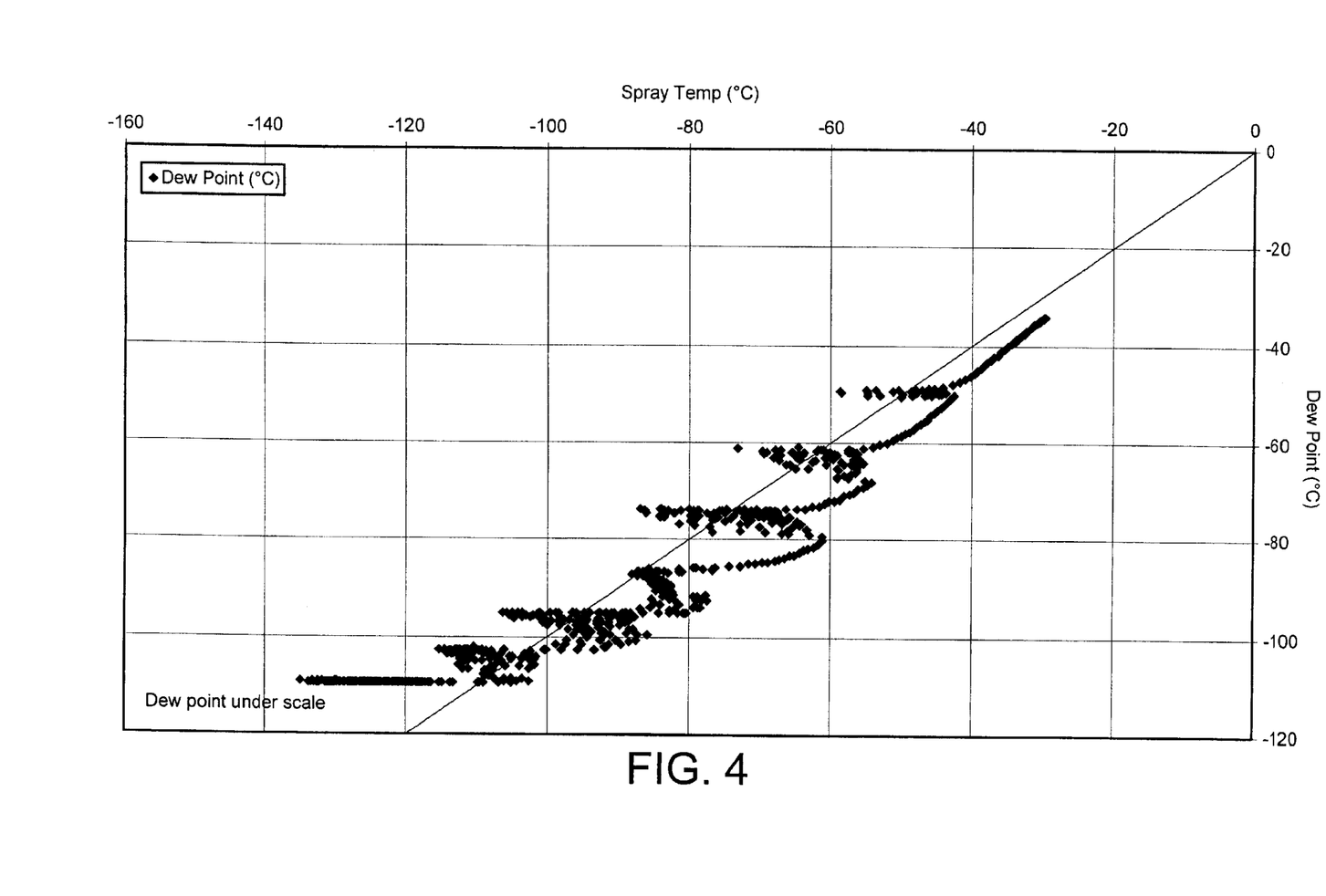
FIG. 4 is a graphical representation of the results of an experiment to remove water ice from a stream of nitrogen using apparatus of the present invention comprising a 1 $\mu$m filter and depicts how the dew point of the exhaust stream varies with temperature from –30° C. to –120° C.

The graphs depicted in FIGS. 3 and 4 respectively show typical operation for a 20 $\mu$m and a 1 $\mu$m PSS filter with dew point plotted against filter housing (or spray) temperature. The solid line in the graphs shows the theoretical 100% efficient line.

From these graphs, it can be seen that both the 1 μm and 20 μm filters are 100% efficient down to about −90° C. However, below this temperature the 20 μm filter struggles to achieve the theoretical line whereas the 1 μm filter maintains the theoretical line down to about or below −110° C. Below this temperature, the measurement probe used by the inventors was operating at the limit of its accuracy range and unable to measure the dew point although, as indicated in the graph, it appears that lower dew points were achieved.

The clusters of points on the graph reflect the nature of the experiment where temperature in the filter housing varied slightly around a set point while the dew point meter is slow to respond to changes at low dew points (due to the nature and location of the measuring probe).

It may be concluded from these experiments that there must be water ice particles below about 20 μm in size when the temperature is below about −90° C. Most operating temperatures of solvent recovery equipment is at or below this temperature to achieve the required emissions standards.

Having illustrated the concept with water ice, the apparatus was modified for use with the solvent trichloroethylene, which is commonly used in industry, for example for degreasing.

Trichloroethylene vapour was introduced to the ice filter and then frozen by direct heat exchange with liquid nitrogen and removed by the filter. A high-pressure back pulse was used periodically to clean the filter.

The performance of the filters may again be judged on the vapour pressure in the exhaust. However, with trichloroethylene, the best measure of the vapour pressure is via a Flame or Photo Ionisation Detector (FID/PID) as this provides the solvent concentration in parts per million ("ppm"). The theoretical saturation vapour concentration (vapour pressure) relationship with temperature can be generated from chemical data and this allows the performance of the filters to be measured against the theoretical maximum. If all the trichloroethylene ice is removed, the concentration of trichloroethylene in the exhaust will be the same as that for the operating temperature in the filter housing. Alternatively, if the concentration is above this level then trichloroethylene ice must be passing through the filter.

Figure 5:
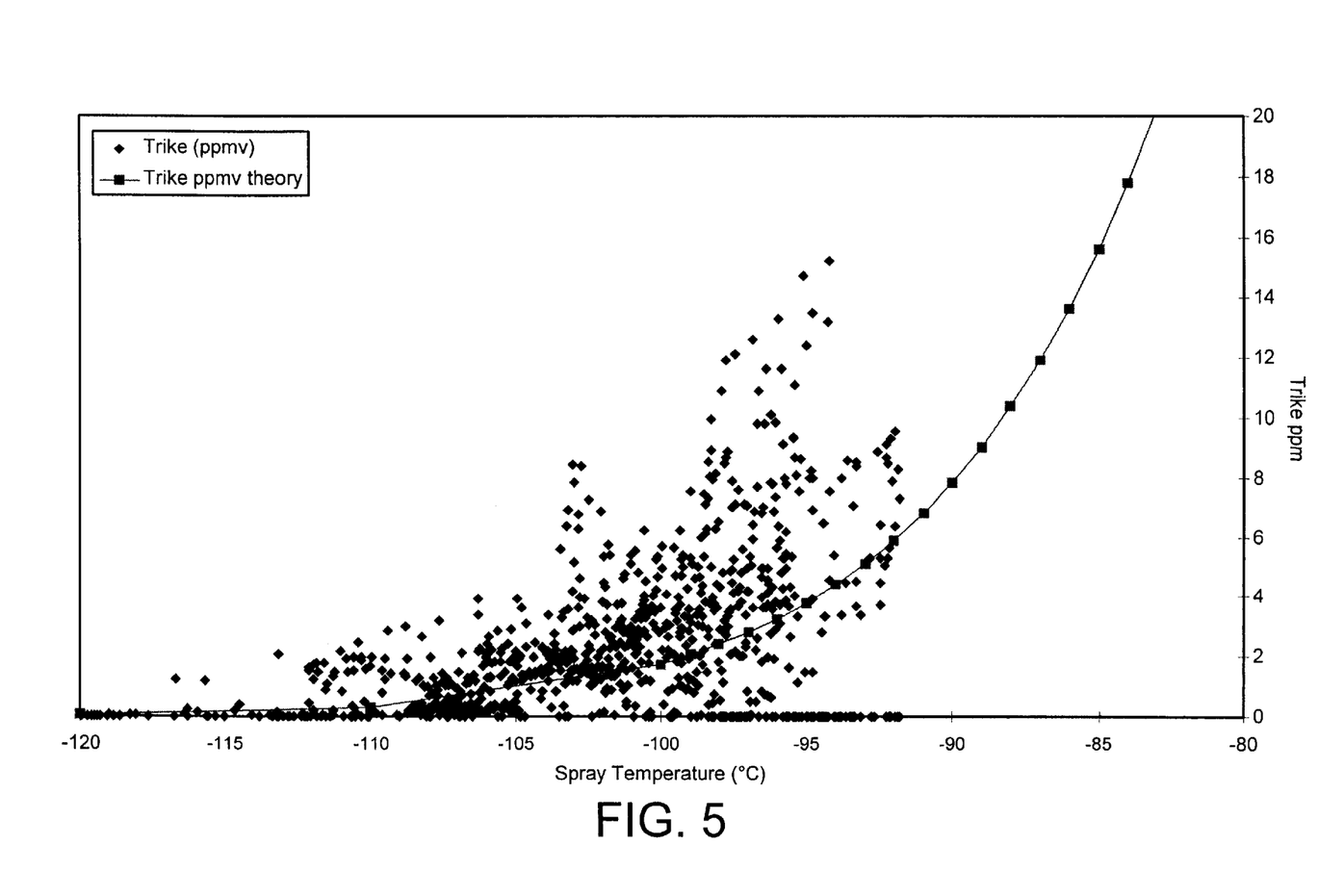
FIG. 5 is a graphical representation of the concentration distribution of trichloroethylene ("Trike") remaining after condensation at various temperatures and passage at the respective temperature through a 20 $\mu$m filter of nitrogen saturated with Trike at ambient temperature.
Figure 6:
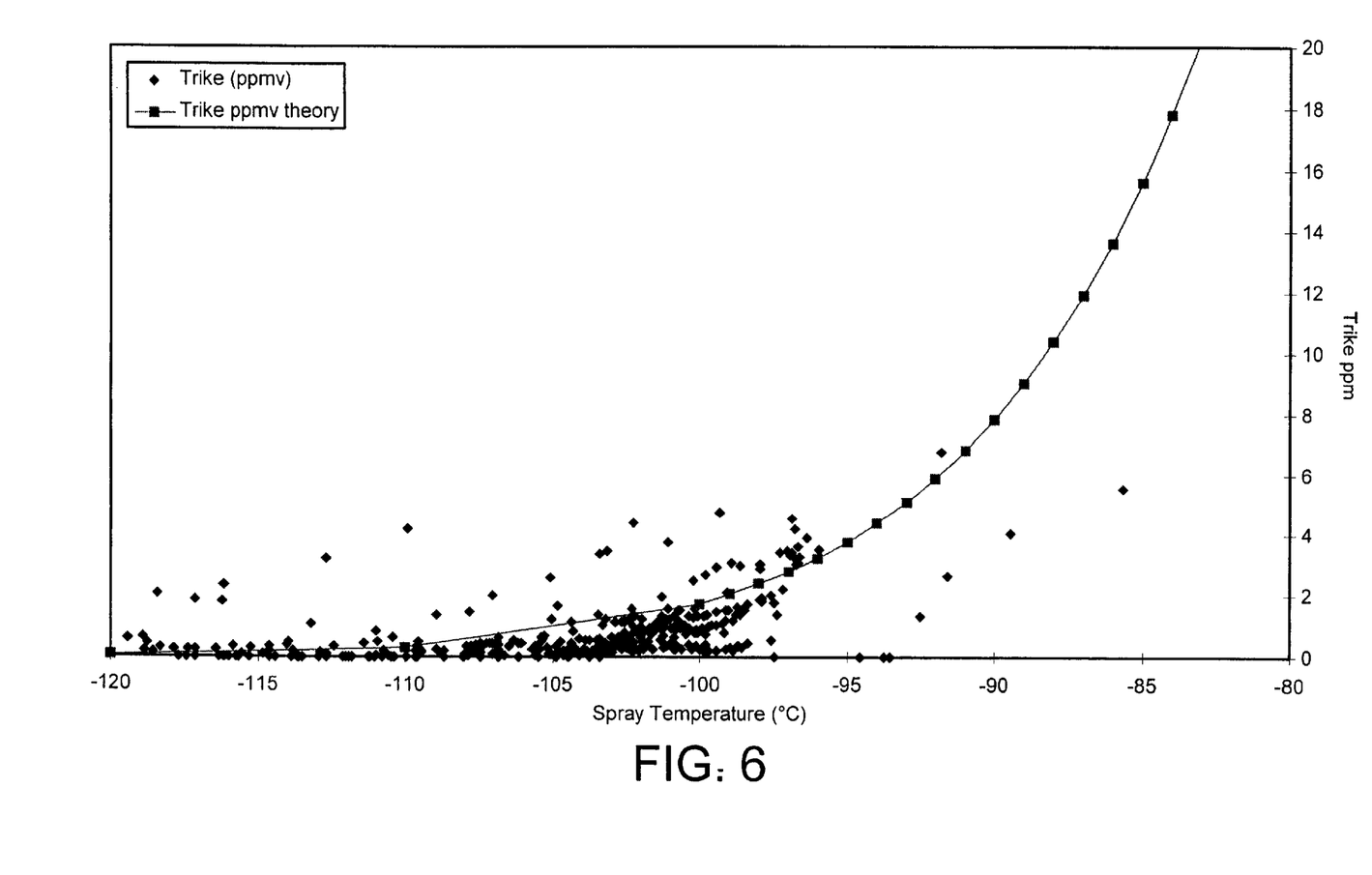
FIG. 6 is a graphical representation of the concentration distribution of trichloroethylene ("Trike") remaining after condensation at various temperatures and passage at the respective temperature through a 1 $\mu$m filter of nitrogen saturated with Trike at ambient temperature.

The graphs depicted in FIGS. 5 and 6 show typical results obtained from using PSS filters having a pore size of 20 μm and 1 μm respectively operating over a temperature range from about −85° C. to about −120° C. The concentration of the trichloroethylene in the exhaust is plotted against the operating (or spray) temperature inside the filter housing.

The temperature within the housing was gradually warmed from about −120° C. to about −85° C. over a period of about 8 hours and the Trike content of the filtered gas was continuously monitored. Each mark on the graphs represents a measurement at the indicated temperature; there being several measurements over a period of time at some temperatures. The solid line in the graphs represents the theoretical saturation concentration of Trike in nitrogen at the specified temperature; thus marks above the solid line indicate that the Trike concentration exceeded saturation level and hence that the filtered gas contained some portion of Trike ice particles.

The difference in the filters is much clearer with trichloroethylene than with water. According to FIG. 6, the 1 μm filter shows 100% efficiency over the full operating range. There is some spread of data points due to the arrangement of the experiment. However, it is clear that the theoretical line has been achieved. It is worth noting that the European limit for trichloroethylene emissions is 2.5 ppm, which equates to an equivalent concentration of 20 mg/m$^3$, which is easily achievable with this filter.

From FIG. 5, it is clear that the 20 μm filter does not achieve the theoretical line. There are large numbers of points above the line showing that trichloroethylene ice must be passing through the filter and raising the concentration of trichloroethylene in the exhaust. Thus, some particles of trichloroethylene ice must be smaller than 20 μm and able to pass though the filter.

It is worth noting that there are a number of points close to the theory line. This is a result of trichloroethylene snow building up a 'cake' on the surface of the filter between the cleaning back pulses. As the layer of trichloroethylene snow builds up, it forms a finer (smaller pore) filter, improving the efficiency, that is until the next back pulse removes the layer. Particles of a size that is less than 20 μm will then pass through the filter again until the 'cake' layer has again built up sufficiently.

It was surprising that there were so many Trike ice particles in the range greater than 1 μm that the Trike contaminant level after cryogenic removal consistently exceeded the theoretical level over a substantial portion of the condensation temperature range.

Figure 7:
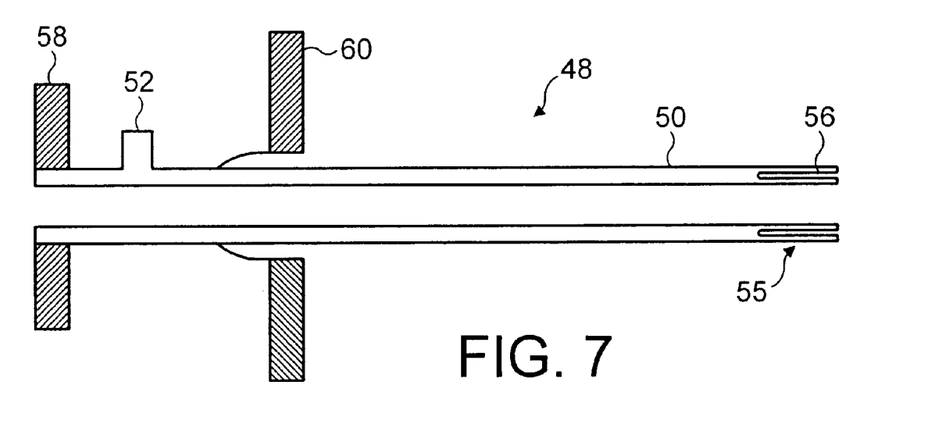
FIG. 7 is a diagrammatic cross-sectional representation of a vacuum insulated nozzle for use with the gas stream inlet.

In FIG. 7, the walls 50 of a vacuum insulated nozzle 48, used to introduce gas into the integrated condenser filter unit 62, comprise a vacuum jacket having a vacuum port 52. The gas stream inlet nozzle 48 has a low loss end 54 with an internal thread 56 for attachment of a spray nozzle (not shown). The gas stream inlet nozzle 48 is held in position across a wall of an integrated condenser/filter unit (not shown) using the flanges 58 and 60. The gas stream inlet nozzle 48 is made from 316 stainless steel.

Figure 8:
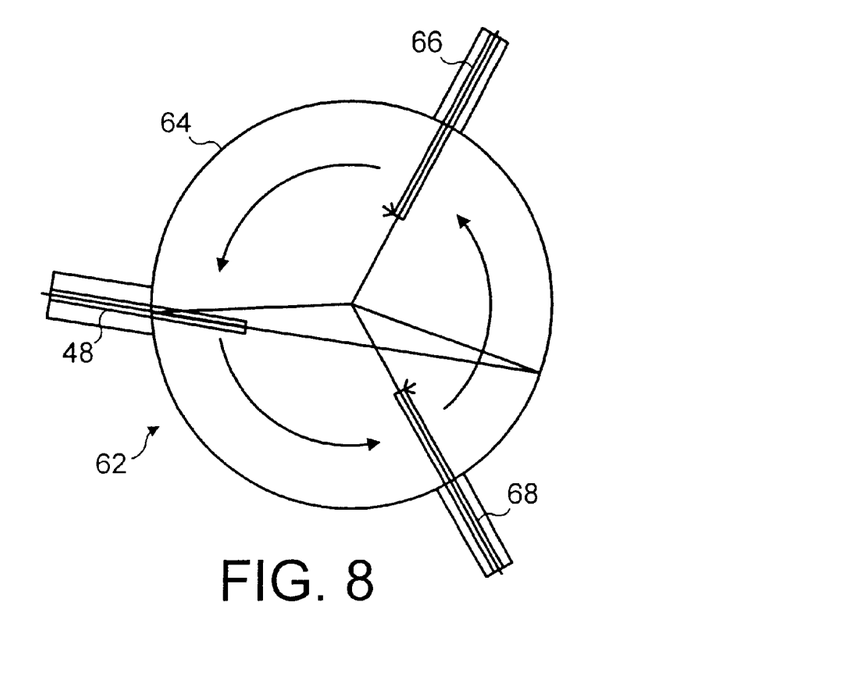
FIG. 8 is a diagrammatic plan view of the integrated condenser/filter unit illustrating one possible arrangement of the gas stream and liquid cryogen inlet nozzles to create a cyclone.

In FIG. 8, the integrated condenser/filter unit 62 has a cylindrical wall 64. The wall is tapered although this tapering is not shown in this figure. A gas stream inlet nozzle 48 and a pair of liquid nitrogen inlet nozzles 66, 68 are evenly spaced around the wall 64 of the unit 62. The gas stream inlet nozzle 48 is orientated at an angle of about 10° to the radius of the unit 62. In this way, the gas stream is encouraged to travel around the inner curved wall 64 of the unit 62 thereby creating a cyclone of gas. Each liquid nitrogen inlet is orientated along the radius of the unit towards the central longitudinal axis and has a spray nozzle. Each spray nozzle directs a liquid nitrogen spray into the unit 62 substantially in the direction of the circulation of the gas stream. The direction of the liquid nitrogen sprays enhances the creation of the cyclone. The effect of the cyclone is that a portion of the ice crystals formed within the unit will be collect at the base of the cyclone and can be removed without passing through the filter.

It will be appreciated that the invention is not restricted to the specific embodiment discussed above and that numerous modifications and variations can be made without departing from the spirit and scope of the invention. For example, the shell-and-tube condensers 30 and 40 can be replaced by other forms of condenser, including those in which there is direct contact between the waste process gas and the liquid nitrogen. Further, the pair of condensers could be replaced by a single condenser and arrangement made for removing VC ice without taking the condenser off line, such as by shaking or vibrating the condenser.

What is claimed is:

1. An apparatus for the cryogenic removal of a volatile compound ("VC") from a process gas stream ($P_W$) comprising:

a condenser for cooling the gas stream to condense the VC to form VC ice and providing a treated process gas which is essentially freed of the VC but contains entrained VC ice particles;

means for providing a vortex of liquid cryogen within the condenser during the cooling of the gas stream; and filter means downstream of the condenser to remove at least said entrained VC ice particles which are of a size greater than 50 μm from the treated process gas stream.

2. The apparatus according to claim 1, wherein the filter means comprises porous ceramic or metal.

3. The apparatus according to claim 2, wherein the filter means comprises sintered porous metal or ceramic.

4. The apparatus according to claim 1, wherein the filter means comprises a cylindrical element of material suspended from a tube plate and enclosed in a housing.

5. The apparatus according to claim 1, wherein the filter means retains particles of at least about 25 μm diameter.

6. The apparatus according to claim 5, wherein the filter means retains particles of at least about 10 μm diameter.

7. The apparatus according to claim 6, wherein the filter means retains particles of at least about 1 μm diameter.

8. The apparatus according to claim 7, wherein the filter means retains particles of at least about 0.3 μm diameter.

* * * * *